United States Patent [19]

Yamao et al.

[11] Patent Number: 5,231,632
[45] Date of Patent: Jul. 27, 1993

[54] RADIO COMMUNICATION EQUIPMENT FOR A MOBILE STATION AND TRAFFIC CHANNEL HAND-OFF METHOD USING THE SAME

[75] Inventors: Yasushi Yamao, Yokosuka; Yoshiaki Tarusawa, Yokohama; Toshio Nojima, Yokosuka, all of Japan

[73] Assignee: Nippon Telegraph and Telephone Corporation, Tokyo, Japan

[21] Appl. No.: 617,369

[22] Filed: Nov. 23, 1990

[30] Foreign Application Priority Data

Nov. 24, 1989 [JP] Japan .................................. 1-306178

[51] Int. Cl.[5] .............................................. H04J 1/00
[52] U.S. Cl. .................................. 370/69.1; 455/33.1
[58] Field of Search ....................... 370/69.1, 95.3, 38, 370/29; 375/5, 7, 9; 455/33, 95

[56] References Cited

U.S. PATENT DOCUMENTS

| | | | |
|---|---|---|---|
| 3,678,391 | 7/1972 | Gough | 370/37 |
| 4,017,799 | 4/1977 | Burdett et al. | 375/7 |
| 4,510,595 | 4/1985 | Glance et al. | 370/30 |
| 4,903,257 | 2/1990 | Tokeda | 370/109 |

FOREIGN PATENT DOCUMENTS

0318033  5/1989  European Pat. Off. .
0324508  7/1989  European Pat. Off. .

OTHER PUBLICATIONS

Patent Abstracts of Japan, vol. 12, No. 420 (E-679), Nov. 8, 1988 & JP-A-63 157 533 (NTT) Jun. 30, 1988.

*Primary Examiner*—Douglas W. Olms
*Assistant Examiner*—T. Samuel
*Attorney, Agent, or Firm*—Pollock, VandeSande and Priddy

[57] ABSTRACT

In radio communication equipment for use in a mobile station, provision is made for selectively applying either one of the oscillation outputs of first and second local oscillators to a transmitting part and a receiving part by first and second RF switches, respectively. In a traffic channel hand-off system for a mobile communication system in which each time the mobile station moves from a certain zone to another, its traffic channel is switched to another traffic channel of a different frequency, a control part responds to a traffic channel assigning signal from the current base station to allot an idle one of the local oscillators to the assigned channel, set the allotted local oscillator to an oscillation frequency corresponding to the assigned channel, and control the second RF switch, in an idle time of the receiving part in the current communication, to set the receiving part to the assigned channel for receiving a down link hand-off preparatory signal from a new base station. Further, the control part controls the first RF switch, in an idle time of the transmitting part in the current communication, to set the transmitting part to the assigned channel for transmitting an up link hand-off preparatory signal to the new base station. These preparatory procedures are followed by controlling the first and second RF switches to supply the oscillation output of the allotted local oscillator to the transmitting part and the receiving part, thereby completing the traffic channel hand-off without momentarily interrupting the communication.

10 Claims, 10 Drawing Sheets

RADIO COMMUNICATION EQUIPMENT FOR A MOBILE STATION AND TRAFFIC CHANNEL HAND-OFF METHOD USING THE SAME

BACKGROUND OF THE INVENTION

The present invention relates to land or air mobile communication which adopts a multi-channel access system such as a time division multiple access (TDMA) system or a frequency division multiple access (FDMA) system which employs a frame configuration including an idle time which is not used for communication of the local station. More particularly, the invention pertains to radio communication equipment adapted to prevent a momentary interruption of communication by hand-off during communication and a traffic channel hand-off method utilizing such radio communication equipment.

With mobile radio communication equipment employing the multi-channel access system, communication is performed over a channel selected from a plurality of radio channels. To this end, a local oscillator is designed to output one of a plurality of frequencies and is often formed by a PLL frequency synthesizer. FIG. 1 shows an example of the construction of conventional multi-channel access radio communication equipment. A transmitting/receiving antenna 11 is connected via a duplexer 12 to a transmitting part 13 and a receiving part 14. The oscillation output of a local oscillator 15 is provided to the transmitting part 13 and the receiving part 14. A control part 16 controls the connection of the transmitting part 13 and the receiving part 14 to a speaker/microphone unit 17 and effects other various control for transmission and reception. When the oscillation frequency of the local oscillator 15 is changed by a frequency assigning signal from the control part 16, transmission and reception frequencies are also changed, that is, the traffic channel is handed off.

In mobile communication, when a mobile station MS moves from a zone $Z_1$ of a base station 24 with which it is currently in communication to a zone $Z_2$ of another base station 25 as shown in FIG. 2, the radio channel frequency $f_1$ of the current base station 24 must be handed off to the radio channel frequency $f_2$ of the new base station 25 so as to continue communication. The hand-off takes place in such a procedure as depicted in FIG. 3. As the mobile station MS in communication with the base station 24 through the channel of the frequency $f_1$ approaches the boundary between the zones $Z_1$ and $Z_2$, the current base station 24 sends a channel assigning signal CAS to the mobile station MS to assign a new channel for communication with the neighboring base station, that is, the frequency $f_2$ and the corresponding slot number. In the mobile station MS, upon receipt of the channel assigning signal CAS, the control part 16 of radio communication equipment 10 shown in FIG. 1 changes the oscillation frequency of the local oscillator 15 formed by a frequency synthesizer. As a result of this, the transmitting part 13 and the receiving part 14 are set to the frequency $f_2$ of the new channel and transmission and reception are initiated on the new channel. In the communication with the same base station, the transmission from the base station to the mobile station (i.e. down link transmission) and the transmission from the mobile station to the base station (i.e. up link transmission) may be effected either at the same frequency or at different frequencies; in either case, the frequency or frequencies for transmission and reception on the same channel will hereinafter be indicated by a common reference character. Hence, the frequency of the current channel used for communication with the current base station 24 and the frequency of the new channel to be used for communication with the new base station will be identified by $f_1$ and $f_2$, respectively, as referred to above in respect of FIGS. 2 and 3.

In the case where the mobile communication system used employs a digital signal, it is necessary, for receiving a signal from the new base station 25, that the clock and frame of the receiving part 14 of the mobile station MS be synchronized with the signal received on the new channel of the frequency $f_2$ and that a receiving device (not shown) of the new base station 25 also be synchronized, in clock, with the signal received from the mobile station MS. To establish such synchronization, as shown in FIG. 3, the new base station 25 transmits a down link synchronizing signal DSYN and the mobile station MS transmits an up link synchronizing signal USYN, after which the new base station 25 transmits a down link continuity test pattern signal DTP composed of a predetermined bit string so as to make sure that transmission and reception over the new channel are effected normally, and then the mobile station MS determines if the down link continuity test pattern signal DTP received is error-free (a down link continuity test). Next, the mobile station MS transmits a similar up link continuity test pattern signal UTP and the new base station 25 determines if the pattern signal UTP received is error-free (an up link continuity test). Where the requirements are fulfilled, communication is enabled over the new channel. Consequently, communication is interrupted momentarily for a period of time Tb from the time when processing for switching from the old channel to the time when communication over the new channel is enabled. It is desirable, from the viewpoint of service to users, that the time of momentary interruption be minimized, but the hand-off time in the prior art is substantially in the range of between tens of and hundreds of milliseconds, since the local oscillator 15 of the radio communication equipment 10 of the mobile station MS is usually formed by a PLL synthesizer of a low loop gain. In consequence, during the hand-off period communication is interrupted in the case of voice communication and information during that time drops out in the case of facsimile or similar data transmission. Moreover, the digital transmission system requires, after the hand-off, the time for establishing signal synchronization between the mobile station and the new base station—this inevitably further lengthens the communication-OFF period.

A hand-off method which does not incur such a momentary interruption of communication is proposed in Japanese Patent Application Laid Open No. 157533/88. According to the proposed method, the mobile station MS has two sets of transmitter-receivers (13a, 14a) and (13b, 14b) as shown in FIG. 4, and the hand-off takes place following the procedure shown in FIG. 5 as described below. When the mobile station MS communicating with the base station of the zone $Z_1$ through the channel of the frequency $f_1$ by use of the one set of transmitter-receiver (13a, 14a) approaches the zone $Z_2$, the base station 24 transmits the channel assigning signal CAS to the mobile station MS to instruct it to use the frequency $f_2$ of the zone $Z_2$. Upon receipt of the channel assigning signal CAS, the mobile station MS sets the other set of transmitter-receiver (13b, 14b) to the channel of the assigned frequency $f_2$. Next, processing for establishment of synchronization, similar to the aforementioned, is performed between the new base station 25 and the transmitter-receiver (13b, 14b) of the mobile station MS, using the down link and up link synchronizing signals USYN and DSYN. After this, a down link continuity test takes place using the down link continuity test pattern signal DTP, followed by an up link continuity test using the up link continuity test pattern signal UTP. In the course of the hand-off processing from the reception of the channel assigning signal CAS to the transmission of the up link continuity test pattern signal UTP, the mobile station MS communicates with the base station 24 over the channel of the frequency $f_1$ through the transmitter-receiver (13a, 14a), and the channel of the frequency $f_1$ is switched to the new channel of the frequency $f_2$ after completion of the up link continuity test with the transmission of the up link continuity test pattern signal UTP. Hence, no momentary interruption will occur in the communication.

The above-mentioned hand-off method is free from the momentary interruption of communication but calls for loading the two sets of transmitters-receivers (13a, 14a) and 13b, 14b) in the mobile station MS—this is not preferable in terms of costs and the space of installation

SUMMARY OF THE INVENTION

It is therefore an object of the present invention to provide simple-structured radio communication equipment which is capable of avoiding the momentary interruption of communication during the hand-off processing.

Another object of the present invention is to provide a hitless hand-off method utilizing the above-mentioned radio communication equipment.

The radio communication equipment of the present invention is used in a mobile station of the multi-channel access type mobile communication system and performs communication over any one of a plurality of radio channels specified by assigning the frequency of a local oscillation signal which is supplied to each of the transmitting part and the receiving part. The radio communication equipment includes: two local oscillators whose oscillation frequencies can be controlled independently of each other; a first RF switch which selects either one of the oscillation outputs of the two local oscillators and supplies it as a local oscillation signal to the transmitting part; and a second RF switch which selects either one of the oscillation outputs of the two local oscillators and supplies it as a local oscillation signal to the receiving part. According to the present invention, the radio communication equipment responds to the channel assigning signal received to allot, for communication over the assigned new channel, one of the two local oscillators which is not in use for current communication, sets the allotted local oscillator to the oscillation frequency corresponding to the new channel, and effects switching control of the first and second RF switches to supply therethrough the output of the above-mentioned allotted local oscillator to the transmitting part and the receiving part during respective idle times in the current communication.

The traffic channel hand-off method of the present invention includes the steps of: responding to the channel assigning signal received in the mobile station to set the idle one of the local oscillators to the oscillation frequency corresponding to the assigned channel; controlling the second RF switch in an idle time of the receiving part to put it in an assigned channel receiving state in which to receive a hand-off preparatory signal from the new base station; controlling the first RF switch in an idle time of the transmitting part to put it in an assigned channel transmitting state in which to transmit a hand-off preparatory signal; and controlling the first and second RF switches to set the transmitting part and the receiving part to the assigned channel.

DESCRIPTION OF THE PREFERRED EMBODIMENTS

Figure 1:
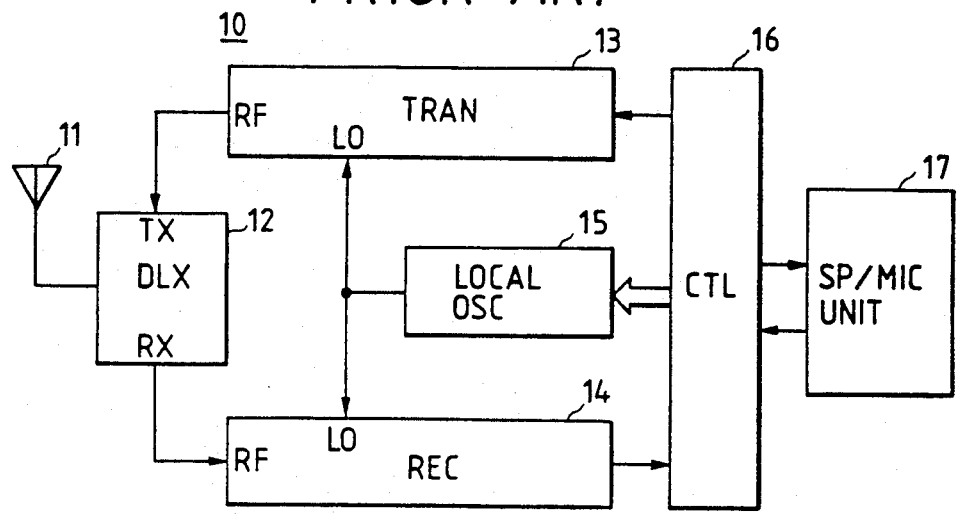
FIG. 1 is a block diagram illustrating an example of conventional radio communication equipment which is provided in a mobile station.
Figure 2:
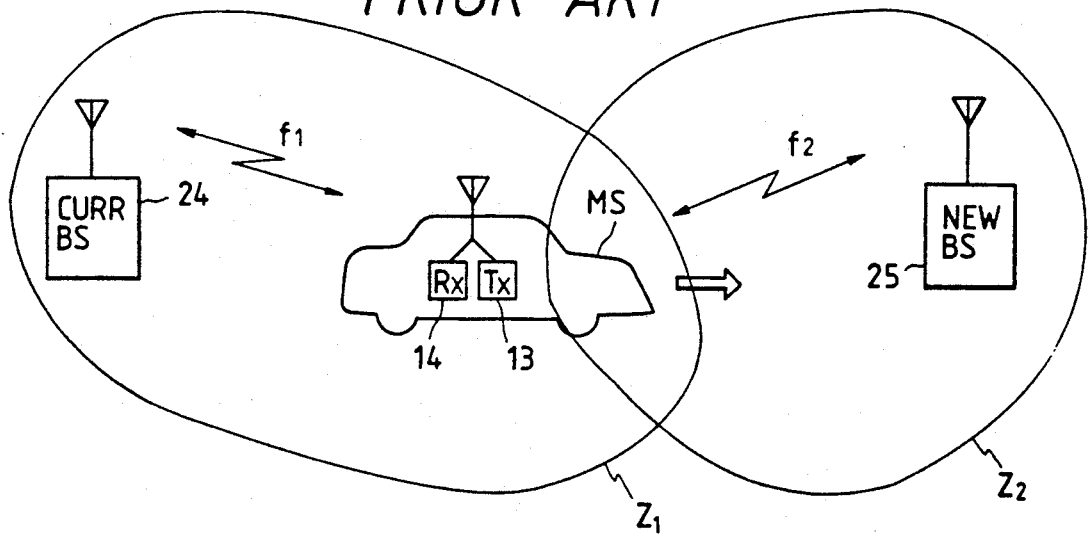
FIG. 2 is a diagram for explaining conventional mobile communication.
Figure 3:
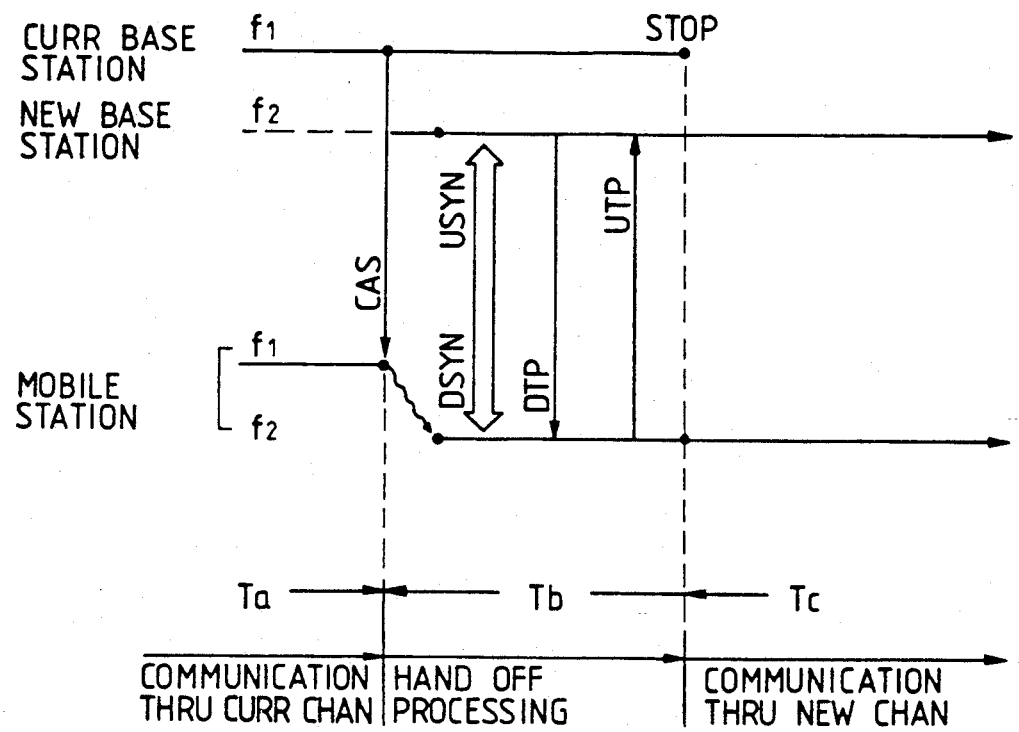
FIG. 3 is a diagram for explaining the procedure of conventional hand-off processing.
Figure 4:
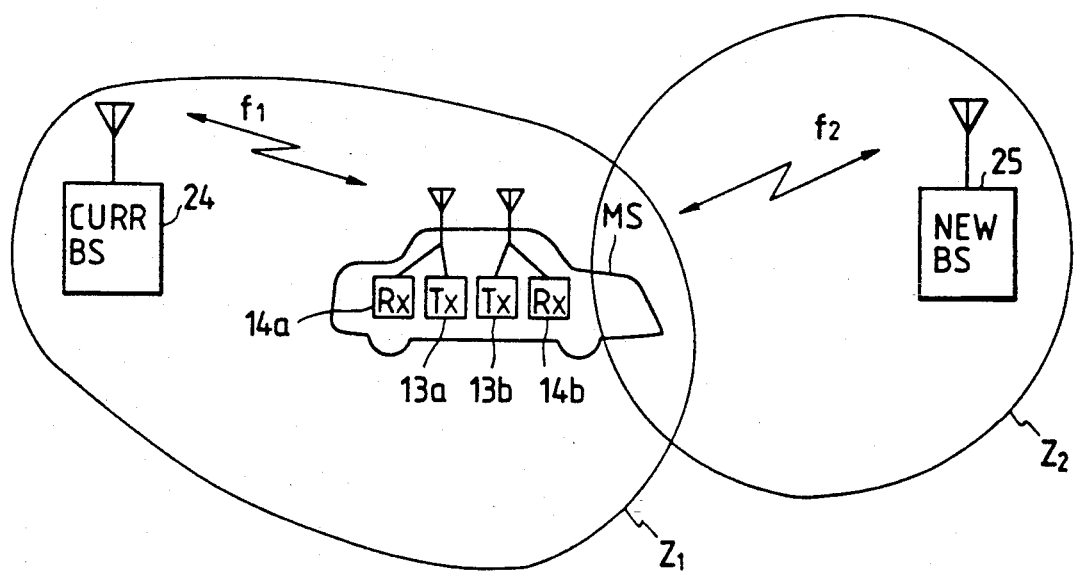
FIG. 4 is a diagram for explaining conventional mobile communication in the case of the mobile station including two sets of transmitter-receivers.
Figure 5:
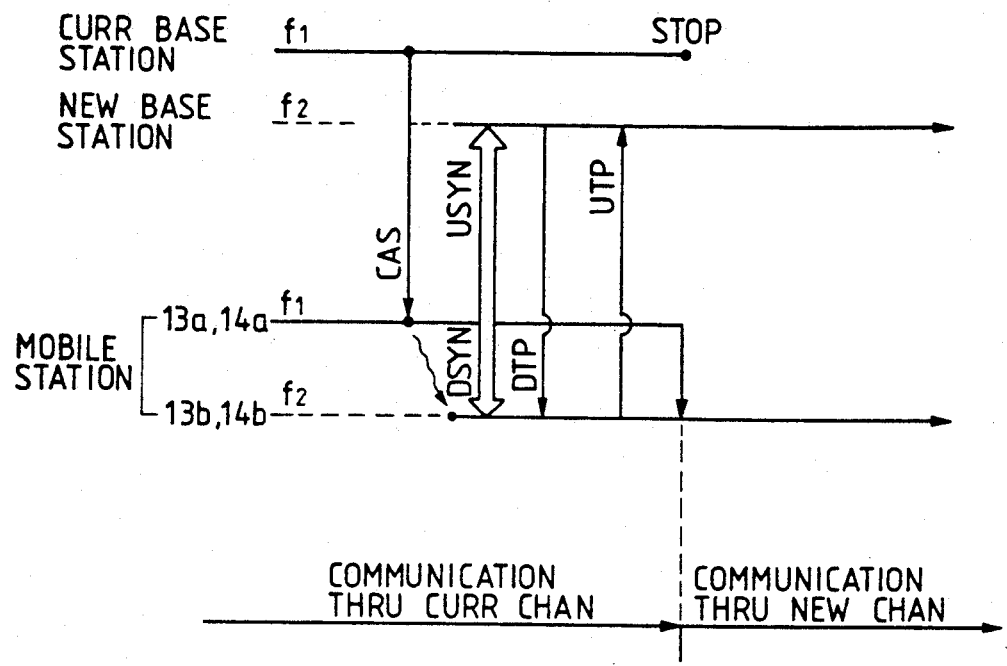
FIG. 5 is a diagram for explaining the procedure of hitless hand-off processing in FIG. 4.
Figure 6:
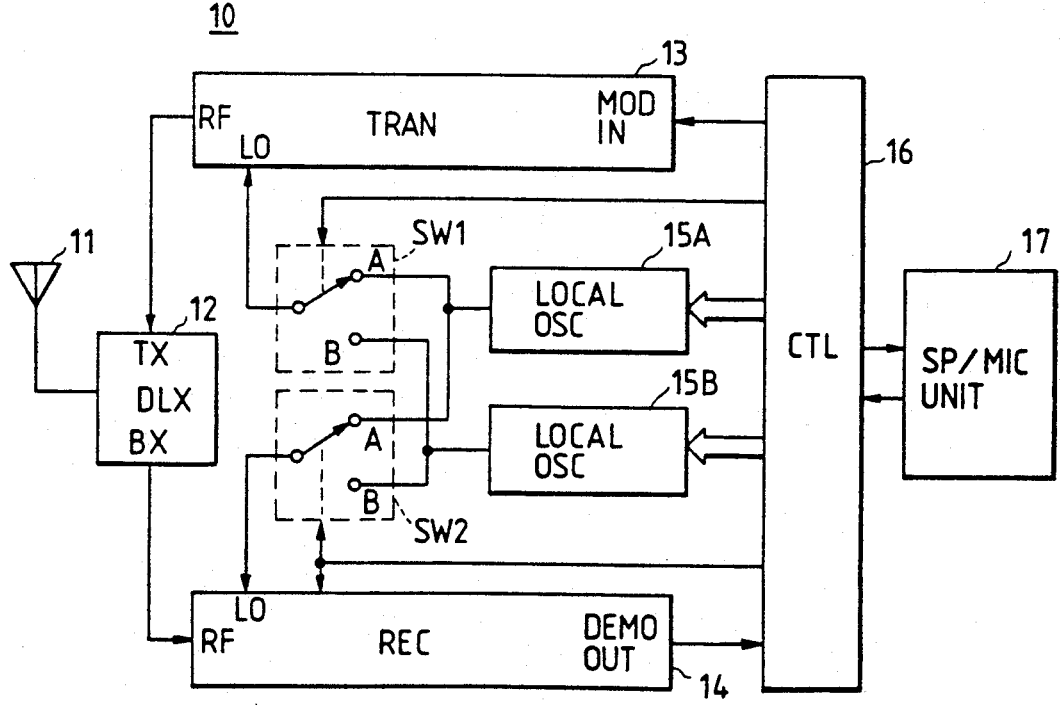
FIG. 6 is a block diagram illustrating an embodiment of the radio communication equipment of the present invention.

FIG. 6 illustrates in block form an embodiment of the radio communication equipment 10 of the present invention which is loaded in the mobile station MS depicted in FIG. 2. The parts corresponding to those in FIG. 1 are identified by the same reference numerals. As is the case with the prior art example shown in FIG. 1, the radio communication equipment of this embodiment includes the transmitting/receiving antenna 11, the duplexer 12, the transmitting part 13, the receiving part 14, the control part 16 and the speaker/microphone unit 17. According to the present invention, two local oscillators 15A and 15B and two single pole double throw (SPDT) RF switches SW1 and SW2 are provided, which are connected so that the outputs of the local oscillators 15A and 15B can be selectively supplied to the transmitting part 13 via the RF switch SW1 and to the receiving part 14 via the RF switch SW2. The receiving part 14 includes two synchronizing circuits which are used for frame and clock synchronization with the received signals, though not shown. The synchronizing circuits are selectively used corresponding to selected positions A and B of the RF switch SW2 an either synchronizing circuit is adapted so that when not selected, it can retain the synchronizing state established when it was used immediately before. The control part 16 selectively connects the speaker/microphone unit 17 to the transmitting part 13 and the receiving part 14, sets the local oscillators 15A and 15B to the local oscillation frequencies corresponding to the frequencies of the channels assigned, and controls the connection of the RF switches SW1 and SW2.

Since single pole double throw switches are employed as the RF switches SW1 and SW2 in FIG. 6, load conditions as viewed from the respective local oscillators differ depending on whether the transmitting part 13 and the receiving part 14 are connected to the same local oscillator 15A or 15B or different oscillators 15A and 15B. Where each local oscillator is formed by a PLL frequency synthesizer, the oscillation frequency of a VCO (Voltage-Controlled Oscillator) used therein is liable to be affected by a load variation. That is, there is a possibility that when the load condition is changed by switching the RF switches SW1 and SW2, the VCO is disturbed and its output frequency momentarily fluctuates. This could be prevented by using, as each of the RF switches SW1 and SW2, a reflectionless SPDT switch SW depicted in FIG. 7.

Figure 7:
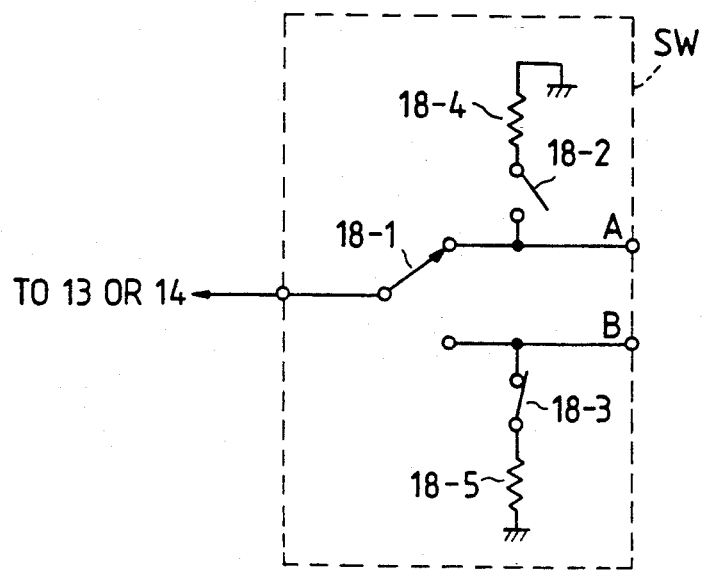
FIG. 7 is a circuit diagram showing an embodiment of an RF switch used in the embodiment of FIG. 6.

In FIG. 7, the positions A and B of an SPDT switch 18-1 which is identical in construction with the RF switch SW1 in FIG. 6, are grounded via single pole single throw switches 18-2 and 18-3 and terminating resistors 18-4 and 18-5, respectively. When the SPDT switch 18-1 is held on the "A" position side as shown, the switch 18-2 is opened and the switch 18-3 is closed, whereas when the SPDT switch 18-1 is held on the "B" position side, the switch 18-2 is closed and the switch 18-3 is opened. By this, the impedance with the input terminals A and B viewed from the outside can be held constant, unaffected by the switching of the switch 18-1. Consequently, it is possible to achieve the switching action which is stable as well to the local oscillator susceptible to the load variation.

Figure 8A:
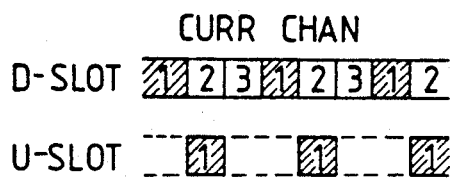
FIG. 8A is a diagram showing slots which are used in the current channel.
Figure 8B:
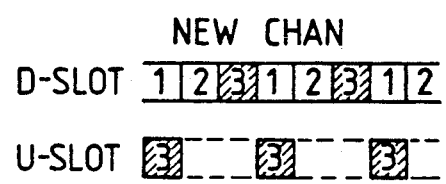
FIG. 8B is a diagram showing slots which are used in the new channel.

Next, the procedure for hand-off operations in this embodiment will be described in connection with a three-channel time division multiple access (TDMA) transmission system. FIG. 8A shows the state of communication between the base station 24 and the mobile station MS prior to the hand-off in FIG. 2, and FIG. 8B shows the state of communication between the base station 25 and the mobile station MS after the hand-off. Now, consider that the mobile station MS loaded with the radio communication equipment 10 of the present invention is to switch the channel for switching communication with the current base station 24 to communicate with the new base station 25. Let it be assumed that in each base station first to third receiving slots (i.e. up link transmission slots) are delayed by one slot time relative to first to third transmitting slots (i.e. down link transmission slots), respectively. The current base station 24 and the mobile station MS communicate with each other using the first slot for both the down link transmission (the base station being the transmitting side and the mobile station the receiving side) and the up link transmission (the base station being the receiving side and the mobile station the transmitting side) which is delayed by one slot time relative to the down link transmission (i.e. the time position corresponding to the second down link transmission slot), as shown in FIG. 8A, in which the slots used are indicated by hatching. Let it be supposed that the new base station 25 and the mobile station MS are to communicate with each other using the third slot for both the down link transmission and the up link transmission the later of which is delayed by one slot time relative to the former (i.e. the timer position corresponding to the first down link transmission slot).

Figure 9:
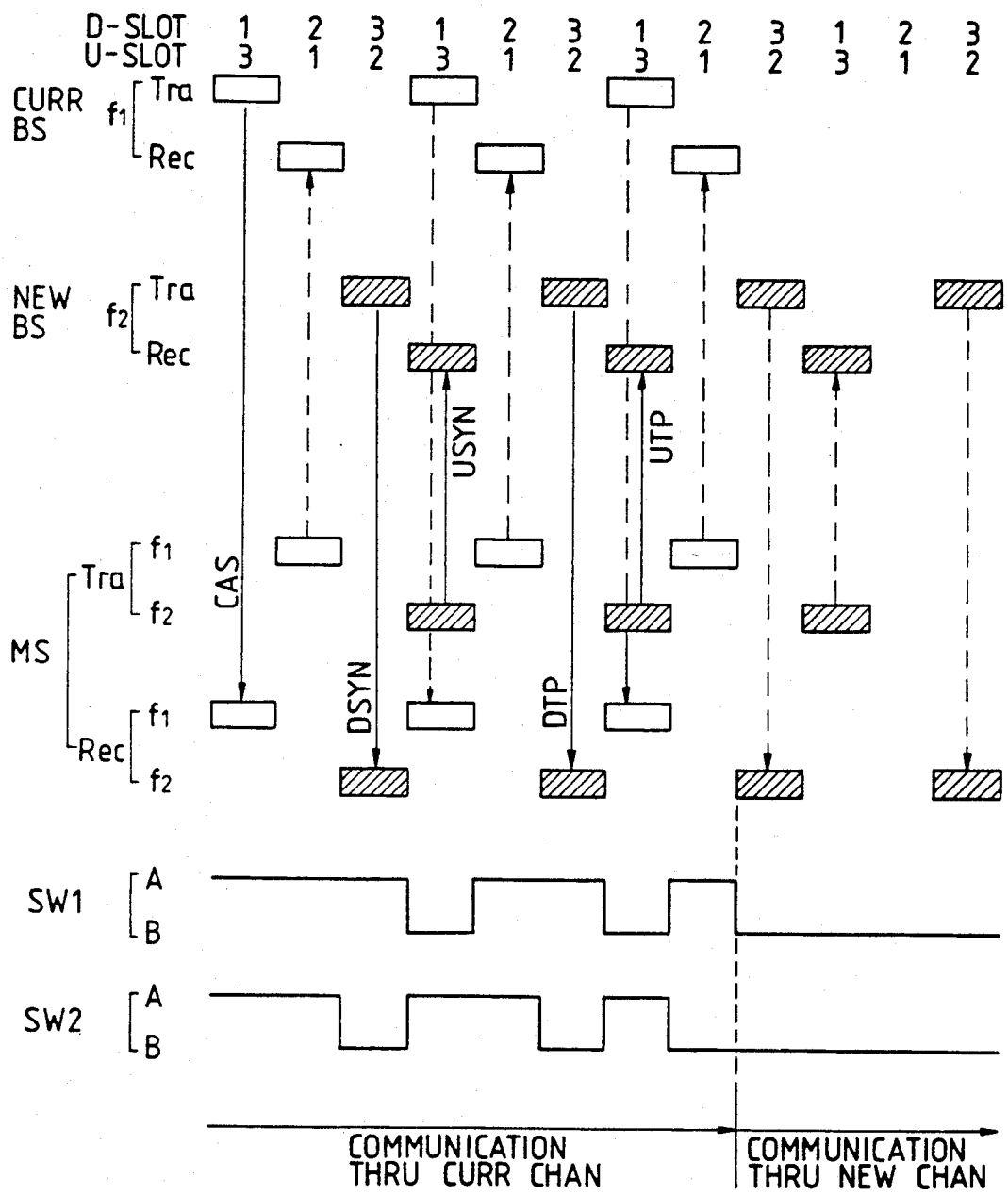
FIG. 9 is a diagram for explaining an embodiment of the hand-off method of the present invention applied to a three-channel TDMA.

FIG. 9 shows an example of the procedure for effecting the hitless hand-off in the above-said case according to the present invention. In FIG. 9 boxes shown represent only slots to be used, each blank box representing a channel for communication between the current base station 24 and the mobile station MS (which channel will hereinafter be referred to as the current channel and will also be identified by the current frequency $f_1$) and each hatched box representing a channel for communication between the new base station 25 and the mobile station MS (which channel will be referred to as the new channel and will also be identified by the new frequency $f_2$). Reference character Tra indicates transmission and Rec denotes reception.

When a hand-off becomes necessary during communication over the current channel $f_1$, the current base station 24 transmits, in a slot 1 (a first down link transmission slot in FIG. 9), the channel assigning signal CAS assigning the new channel (i.e. the frequency $f_2$ of the new channel and the slot number) in its communication signal. This channel assigning signal CAS is sent in the form of an in-service signal, for example. In an up link transmission slot 1 the mobile station MS sends a communication signal. Hence, provided that the mobile station MS is using the local oscillator 15A for the communication with the current base station 24, the RF switches SW1 and SW2 are both set to the local oscillator 15A side (i.e. the position "A") during the down and up link slots 1 as shown at rows SW1 and SW2 in FIG. 9, and consequently, the output of the local oscillator 15A is applied to the transmitting part 13 and the receiving part 14.

Prior to the hand-off it is necessary for the mobile station MS to establish frame and bit synchronization with a signal received on the newly assigned channel $f_2$ and to make a continuity test. To this end, the mobile station MS assigns the local oscillator 15B, not in use for the current communication, for the reception on the new channel, based on the channel assigning signal CAS transmitted from the current base station 24 in the down link transmission slot 1, and sets the oscillation frequency of the local oscillator 15B to the frequency corresponding to the frequency $f_2$ of the new channel, and further, switches the RF switch SW2 to the local oscillator 15B side (i.e. the position "B") in a down link transmission slot 3 of the new channel. After completion of setting of the oscillation frequency of the local oscillator 15B for the new channel $f_2$ in the mobile station MS, the new base station 25 transmits thereto the down link synchronizing signal DSYN in the down link transmission slot 3 of the new channel $f_2$. The mobile station MS receives this down link synchronizing signal DSYN and synchronizes its synchronizing circuit (not shown) with the signal DSYN, thereafter returning the RF switch SW2 to the local oscillator 15A side. In the next down link transmission slot 1 the current base station 24 transmits an ordinary communication signal through the current channel $f_1$ and the mobile station MS receives the communication signal and, at the same time, switches the RF switch SW1 to the local oscillator 15B side to transmit the up link synchronizing signal USYN to the new base station 25 through an up link transmission slot 3 of the new channel. Following this, the RF switch SW1 is returned to the local oscillator 15A side. The new base station 25 synchronizes the clock of its receiving device (not shown) with the up link synchronizing signal USYN received from the mobile station MS. Incidentally, it is assumed that the frame synchronization is maintained among the radio communication equipments of all the base stations 24, 25, . . .

In the next up link transmission slot 1 the mobile station MS transmits an ordinary communication signal to the current base station 24 through the current channel $f_1$. Next, the new base station 25 transmits the down link continuity test pattern signal DTP, using a down link transmission slot 3 of the new channel $f_2$. In the down link transmission slot 3 the mobile station MS switches the RF switch SW2 to the local oscillator 15B side and receives the down link continuity test pattern signal DTP, thereafter returning the RF switch SW2 to the local oscillator 15A side. In a third down link transmission slot 1 an ordinary communication signal is transmitted from the current base station 24 through the current channel $f_1$ and is received by the mobile station MS. At the same time, the mobile station MS switches the RF switch SW1 to the local oscillator 15B and transmits the up link continuity test pattern signal UTP to the new base station 25 through the new channel $f_2$. After the transmission of the test pattern signal UTP the RF switch SW1 is returned to the local oscillator 15A side. In a third up link transmission slot 1 the mobile station MS transmits an ordinary communication signal to the current base station 24 over the current channel $f_1$ and switches the RF switch SW2 to the local oscillator 15B side. Upon completion of the transmission, the RF switch SW1 is switched to the local oscillator 15B side. Thereafter the mobile station MS is in the ordinary state of communication with the new base station 25 over the new channel $f_2$.

As described above, according to the radio communication equipment 10 and the hand-off procedure of the present invention, establishment of synchronization between the mobile station MS and the new base station 25 and continuity tests therebetween can be achieved without interrupting the communication therebetween; namely, it is possible to perform channel switching with no momentary interruption of communication. The synchronizing signals and the continuity test pattern signals which are transmitted and received are signals which are used to make preparations for the traffic channel hand-off. By using, as each RF switch, a semiconductor switch utilizing GaAs FET's or PIN diodes, the guard time for the hand-off can be neglected, because the switch change-over time is a maximum of several to tens of nanoseconds.

Figure 10:
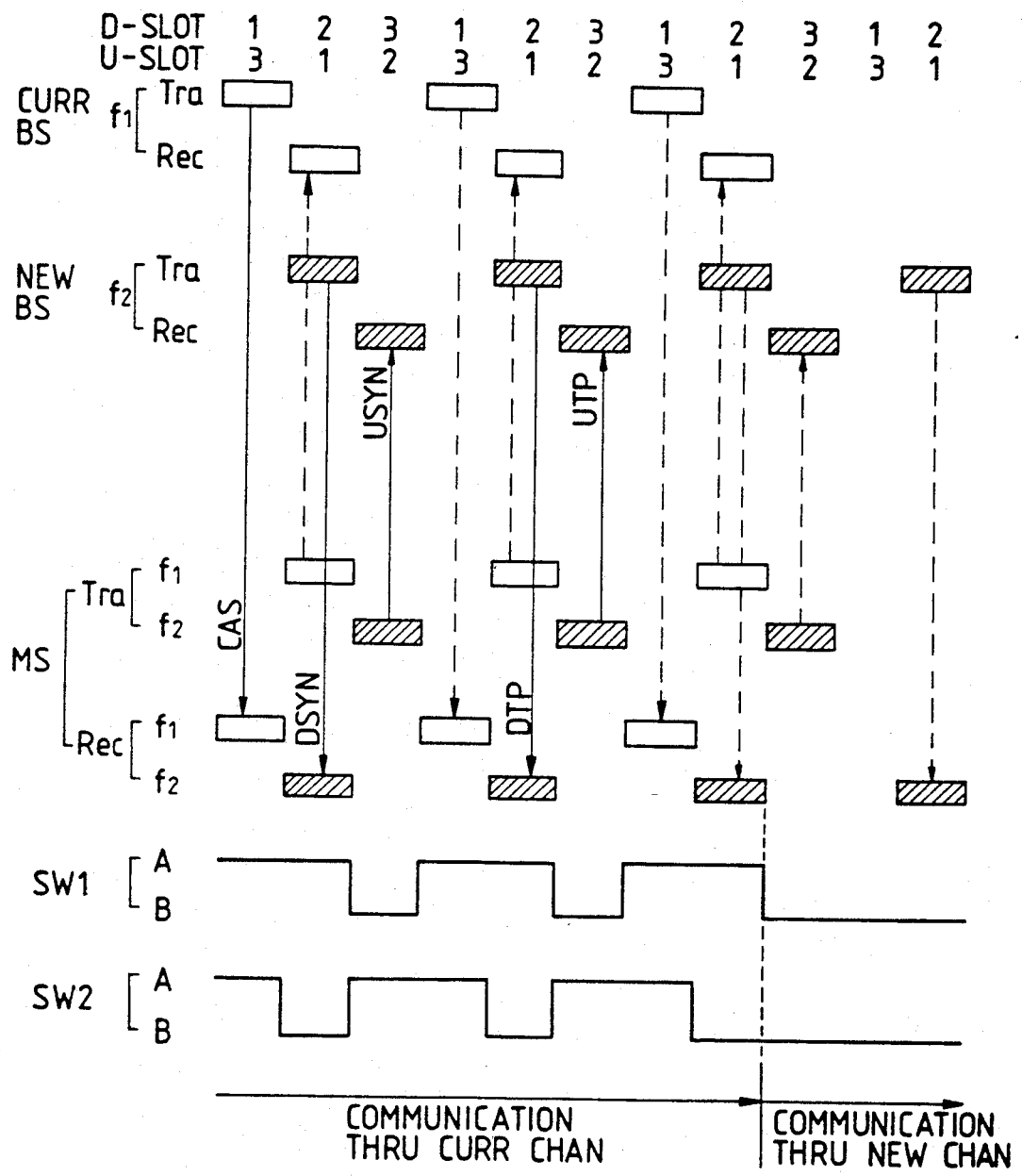
FIG. 10 is a diagram illustrating another embodiment of the hand-off method of the present invention applied to the three-channel TDMA.

While in the embodiment of FIG. 9 the down and up link transmission slots 3 are used for communication between the new base station 25 and the mobile station MS, the hitless hand-off can be achieved using down and up link transmission slots 2. FIG. 10 shows an example of the procedure for such hand-off, and its contents are similar to those described above with regard to FIG. 9 except that the slots for communication between the new base station 25 and the mobile station MS differ from those in FIG. 9 by only one slot, so the procedure can easily be understood from the description given of FIG. 9 and hence will not be described. At any rate, the point is that the down link transmission slot of the current channel $f_1$ for transmission from the current base station 24 to the mobile station MS must not coincide with the down link transmission slot of the new channel $f_2$ which is to be assigned to the mobile station MS for communication with the new base station 25. Even if the up link transmission slot 3 of the new channel $f_2$ and the down link slot 1 of the current channel $f_1$ coincide with each other as in the case of FIG. 9, and even if the down link transmission slot 2 of the new channel $f_2$ and the up link transmission slot 1 of the current channel $f_1$ coincide with each other as in the case of FIG. 10, the hitless hand-off can be achieved according to the present invention. The reason for this is that although the radio communication equipment 10 of the present invention which is loaded in the mobile station MS, shown in FIG. 6, includes only one pair of transmitting part 13 and receiving part 14, the mobile station MS can transmit a signal to the new base station 25 while at the same time receiving a signal from the current base station 24 (FIG. 9) or it can receive a signal from the new base station 25 while at the same time transmitting a signal to the current base station 24 (FIG. 10).

Figure 11:
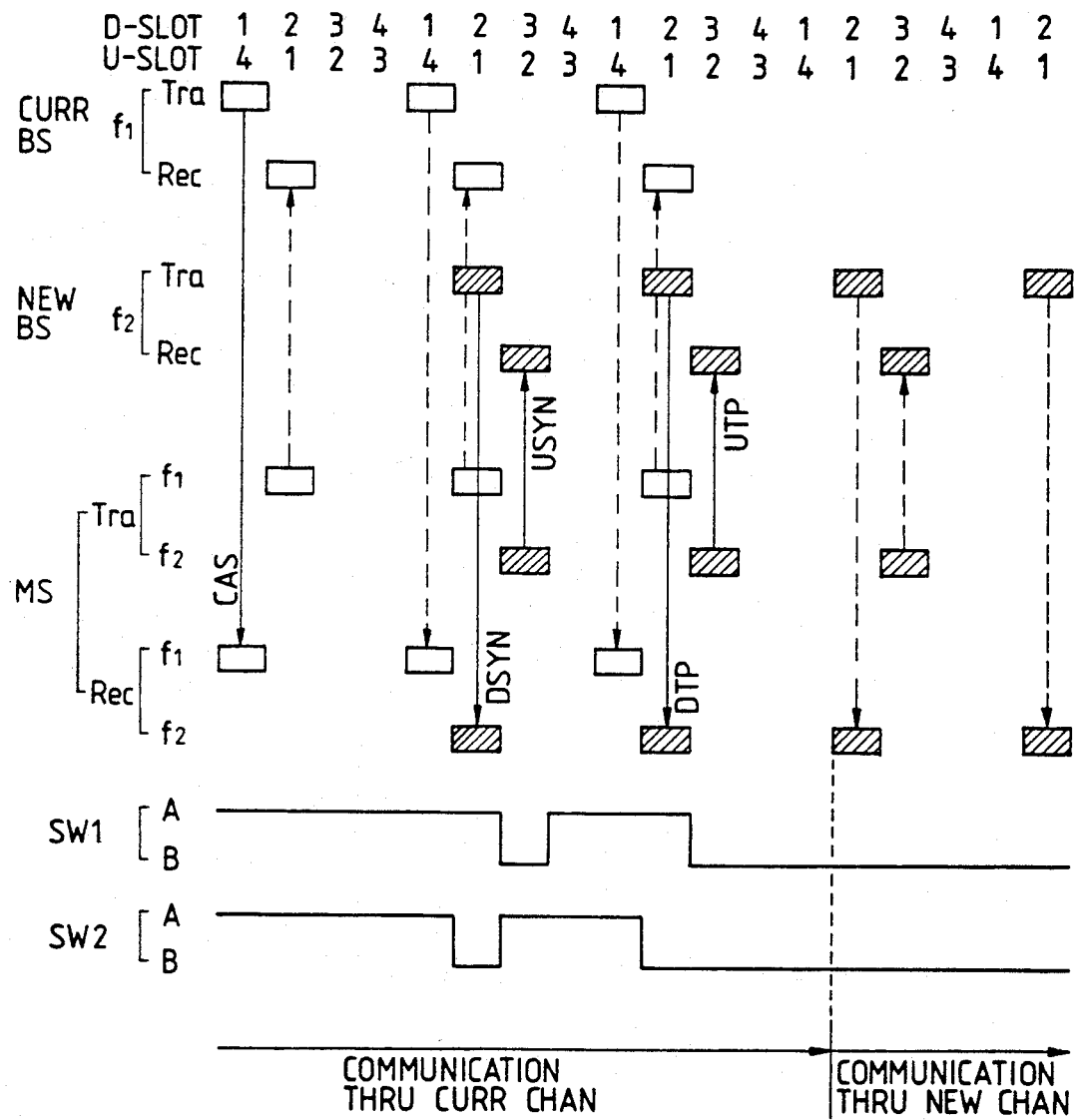
FIG. 11 is a diagram showing another embodiment of the hand-off method of the present invention applied to a four-channel TDMA.
Figure 12:
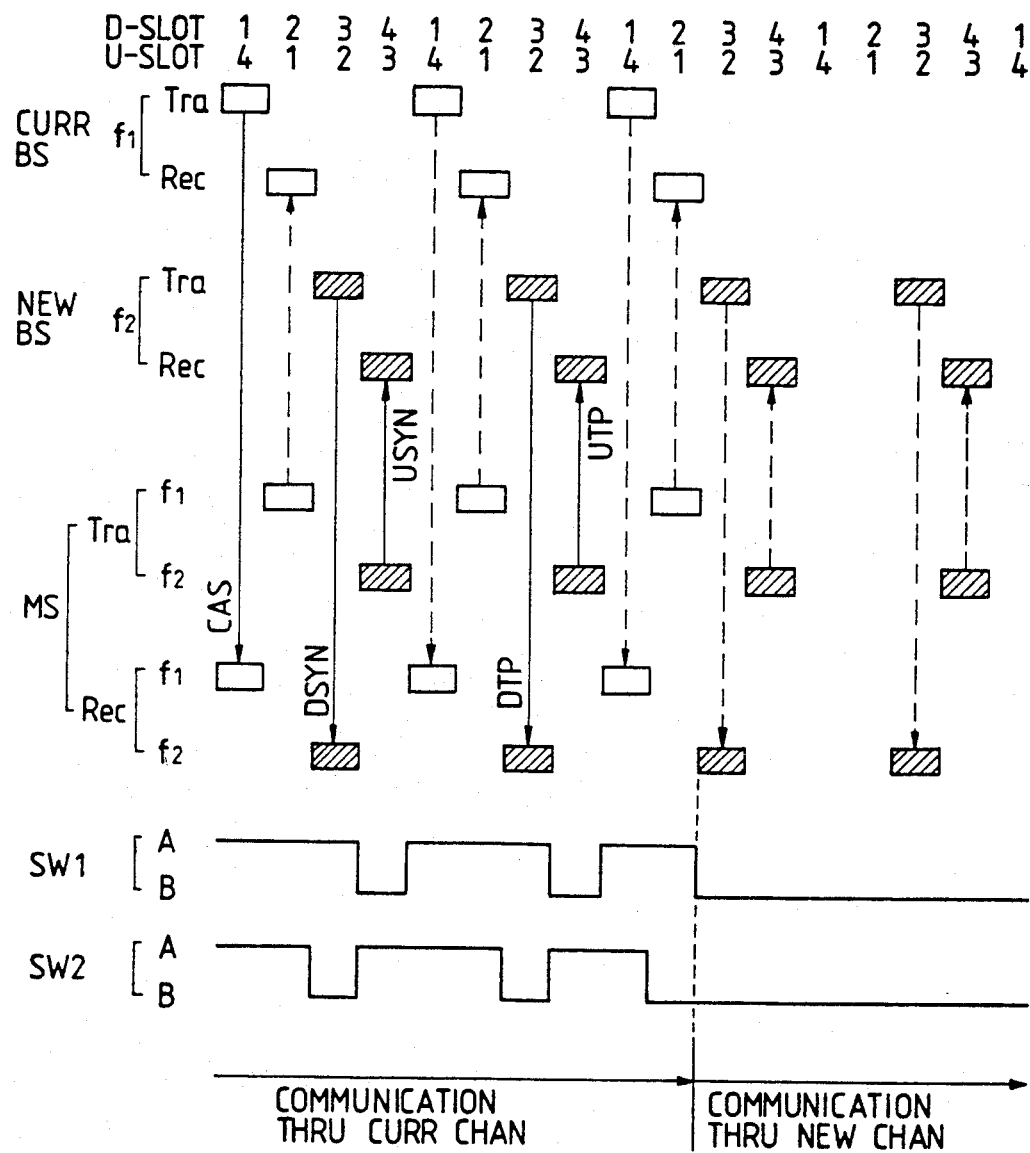
FIG. 12 is a diagram showing another embodiment of the hand-off method of the present invention applied to the four-channel; TDMA.
Figure 13:
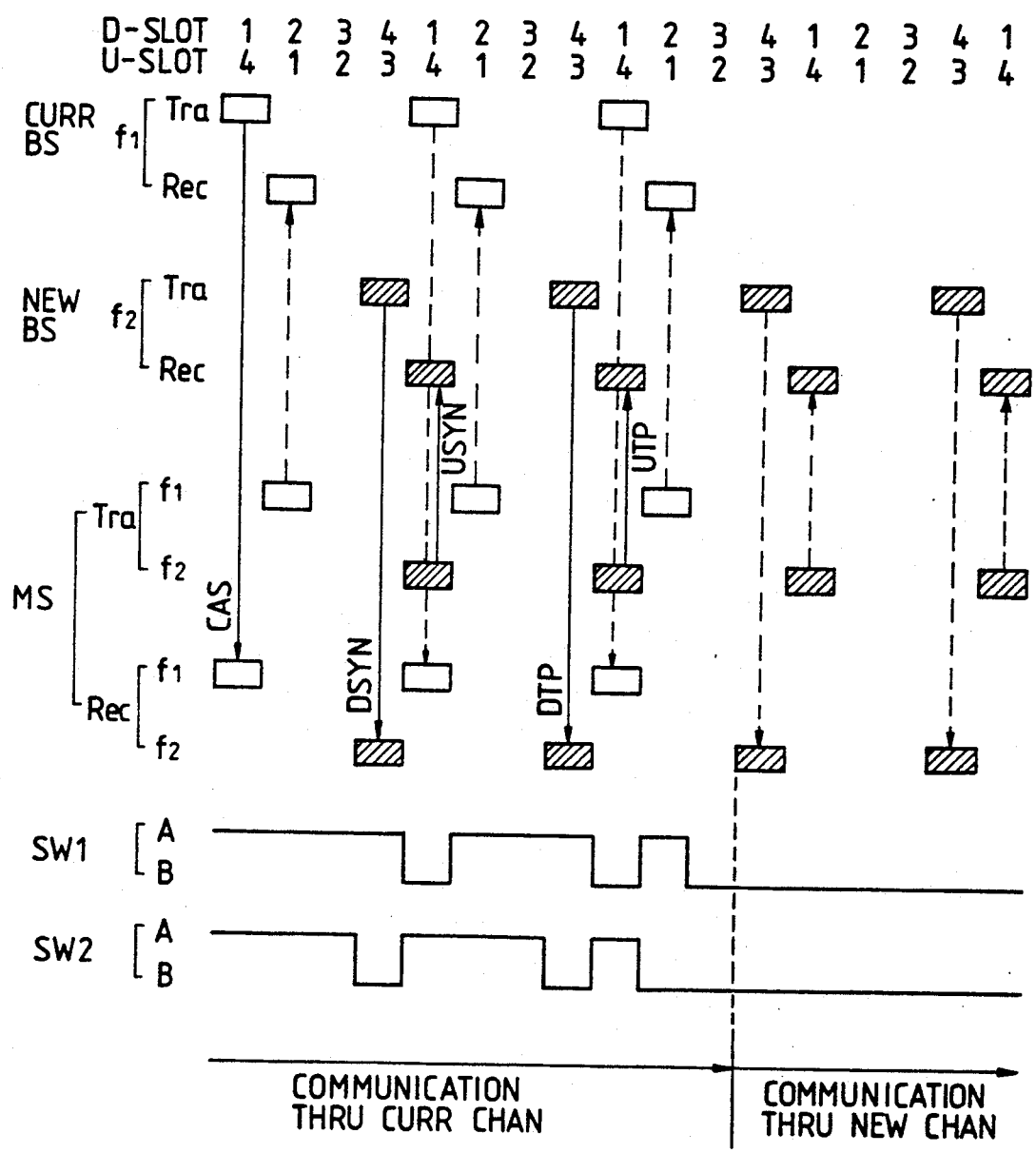
FIG. 13 is a diagram showing still another embodiment of the hand-off method of the present invention applied to the four-channel TDMA.

While the present invention has been described above as being applied to a three-channel-multiplex TDMA system, it is apparent that the invention is applicable as well to the case where the number of channels multiplexed is four or more. FIGS. 11 through 13 shows three possible examples of the hand-off procedure in the cases where the hand-off method of the present invention is applied to a four-channel TDMA system. In any case, the down link transmission slot of the current channel $f_1$ for the transmission from the current base station 24 to the mobile station MS is the slot 1 as is the case with FIG. 9. FIG. 11 shows the case of assigning a down link transmission slot 2 of the new channel $f_2$ for the transmission from the new base station 25 to the mobile station MS and FIGS. 12 and 13 show cases of similarly assigning down link transmission slots 3 and 4, respectively.

In the case of FIG. 11 it is necessary that the mobile station MS receive a signal from the new base station 25 while at the same time transmitting a signal to the current base station 24, and in the case of FIG. 13 it is necessary that the mobile station MS transmit a signal to the new base station 25 while at the same time receiving a signal from the current base station 24. Also in these cases the hitless hand-off can be effected by use of the radio communication equipment 10 depicted in FIG. 6.

In the case of FIG. 12, since the transmission slots for communication between the current base station 24 and the mobile station MS and between the new base station 25 and the mobile station MS do not overlap, the radio communication equipment 10 of the present invention and the conventional radio communication equipment 10 shown in FIG. 1 equally permit the hitless hand-off. The procedures shown in FIGS. 11 through 13 can easily be understood from the description given above in respect of FIG. 9, and hence will not be described.

In each of the hand-off procedures depicted in FIGS. 9 through 13, since the slots for transmission and reception over the same channel differ from each other by one slot time, either the same or different frequencies can be employed for transmission and reception on the same channel. Where different frequencies are used, the transmission and reception can also be effected in slots which overlap each other. Of course, the present invention is applicable in this case, too. Moreover, it is obvious that the present invention is applicable as well to a communication system in which, once the mobile station MS and the new base station 25 are synchronized with their received signal by the transmission of the down link and up link synchronizing signals DSYN and USYN, the hand-off processing is completed without making the continuity tests and communication on the new channel is started.

Figure 14:
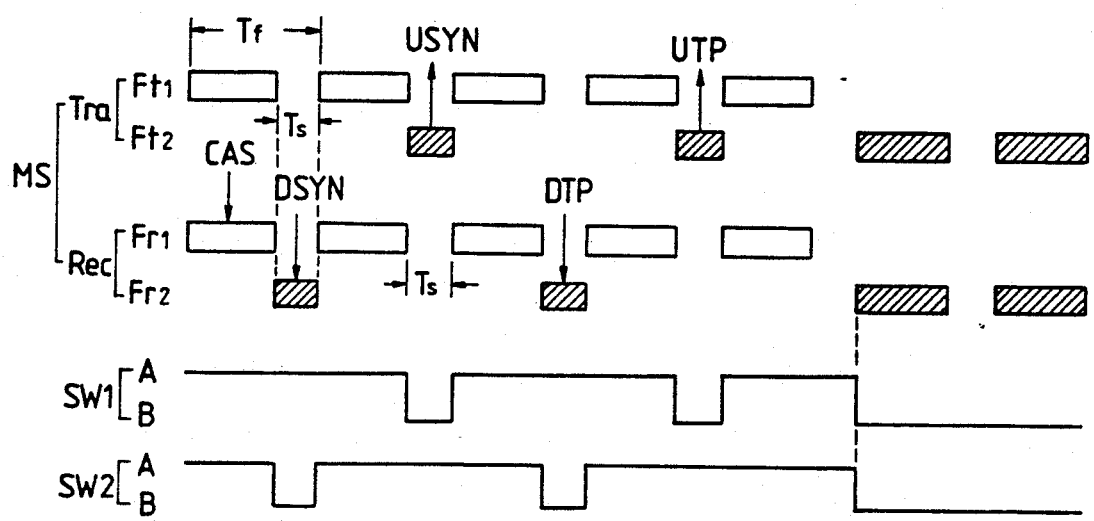
FIG. 14 is a diagram for explaining a further embodiment of the hand-off method of the present invention applied to an FDMA.

The present invention can be applied as well to a frequency division multiple access (FDMA) system which has a frame configuration including an idle time which is formed by time-compressing an information signal and is not used for communication of the local station. FIG. 14 show an example of the hand-off procedure in this instance. In FIG. 14 there are shown only the states of transmission Tra and reception Rec of the mobile station MS and the states of the RF switches SW1 and SW2, while the transmitting and receiving states of the base stations 24 and 25 being omitted. In the base stations 24 and 25 a frequency-division-multiplexed signal is time-compressed every frame of a duration Tf to provide an idle time Ts before it is transmitted. The mobile station MS also time-compresses a signal every frame of the duration Tf to provide the idle time Ts as shown in FIG. 14 and then transmits the signal. In FIG. 14 the transmitting frequency and the receiving frequency of the mobile station MS on the current channel are indicated by $Ft_1$ and $Fr_1$, respectively, and the transmitting and receiving frequencies of the new channel are indicated by $Ft_2$ and $Fr_2$, respectively. FIG. 14 shows the case where transmission and reception are performed in overlapping time slots. As will be seen from FIG. 14, having received the channel assigning signal CAS from the current base station 24, the mobile station MS receives the down link synchronizing signal DSYN in the next idle time Ts and then transmits the up link synchronizing signal USYN to the new base station 25 in the second idle time Ts. Further, the mobile station MS receives the down link continuity test pattern signal DTP from the new base station 25 in the third idle time Ts and, in the next idle time Ts, transmits the up link continuity test pattern signal UTP to the new base station 25. In this way, the hitless hand-off can be achieved.

Figure 15:
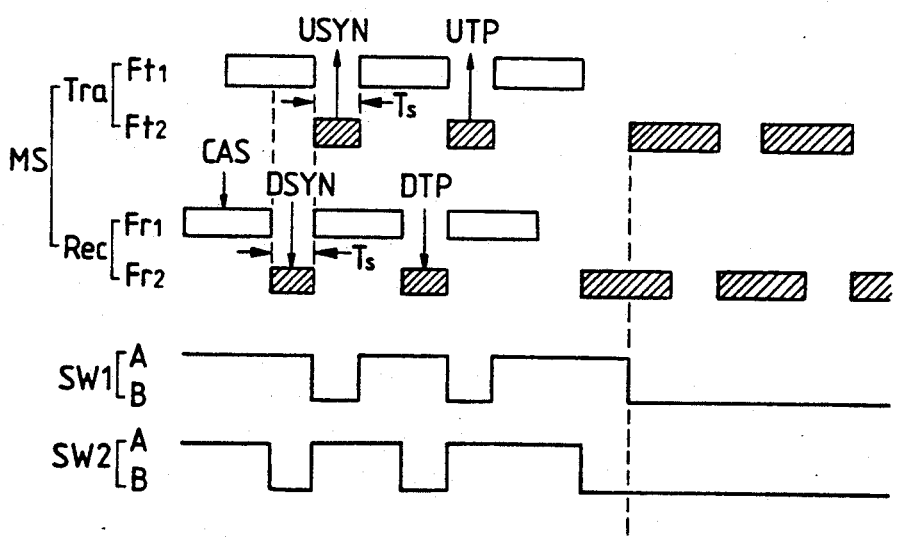
FIG. 15 is a diagram for explaining a still further embodiment of the hand-off method of the present invention applied to the FDMA.

FIG. 14 has been described with the case where the idle time for transmission and the idle time for reception coincide with each other, but by making provision for preventing these idle times from overlapping each other as shown in FIG. 15, the function characteristic of the radio communication equipment 10 of the present invention, shown in FIG. 6, is effectively utilized, by which the elapsed time from when the channel assigning signal CAS is received until the hand-off procedure is completed can be reduced more than in the case of FIG. 14. That is, upon receipt of the channel assigning signal CAS from the current base station 24, the mobile station MS receives the down link synchronizing signal DSYN from the new base station 25 in the next receiving idle time Ts and, immediately thereafter, transmits the up link synchronizing signal USYN to the new base station 25 in the subsequent transmitting idle time. Further, the mobile station MS receives the down link continuity test pattern signal DTP from the new base station 25 in the second receiving idle time and immediately transmits the up link continuity test pattern signal UTP to the new base station 25 in the succeeding transmitting idle time. Consequently, the hand-off procedure is completed two frame periods earlier than in the case of FIG. 14. Incidentally, in the case of providing an idle time Ts by time-compressing an analog signal in the FDMA communication, no synchronizing signals are transmitted and received, because there is no need of establishing clock synchronization with received signals in the mobile station and the base stations.

As described above, in a communication system which covers a plurality of zones the present invention permits the hitless hand-off between the zones, and hence improves the communication quality and is of particularly great utility when employed in facsimile and data transmission.

One possible method for increasing the subscriber capacity in the mobile communication is to reduce the radius of each zone, but this method poses a problem as it increases the frequency of hand-off. In such an instance, the present invention is very useful for a future increase in the subscriber capacity. Besides, the present invention is applicable to the mobile communication of aircraft utilizing an artificial satellite as well as to the land mobile communication.

It will be apparent that many modifications and variations may be effected without departing from the scope of the novel concepts of the present invention.

What is claimed is:

1. Radio communication equipment for a mobile station in a mobile communication system in which each time said mobile station moves from a certain zone to another, its current traffic channel is switched to a new channel of a different frequency, comprising:
   a transmitting part for generating a transmission signal;
   a receiving part for receiving a signal;
   first and second local oscillators of independently controllable oscillation frequencies;
   a first RF switch for selectively supplying either one of the oscillation outputs of said first and second local oscillators, as a local oscillation signal, to said transmitting part;
   a second RF switch for selectively supplying either one of the oscillation outputs of said first and second local oscillators, as a local oscillation signal, to said receiving part; and
   control means for allotting, in response to a channel assigning signal received by said receiving part, one of said first and second local oscillators which is not being used for current communication to a channel assigned by said channel assigning signal, for setting said allotted local oscillator to an oscillation frequency corresponding to the frequency of said assigned channel, and for controlling said first and second RF switches so that the oscillation output of said allotted local oscillator is temporarily supplied to said transmitting part and said receiving part in respective idle times in said current communication.

2. The radio communication equipment of claim 1, wherein said first and second RF switches each include an RF single pole double throw switch having first and second selection contacts connected to the outputs of said first and second local oscillators, respectively, for selectively outputting the local oscillation signal of either one of said first and second local oscillators, and a series connection of a single pole single throw switch and a terminating resistor connected between each of said first and second selection contacts and ground.

3. A traffic channel hand-off method for a mobile communication system in which each time a mobile station, loaded with radio communication equipment adapted to selectively apply either one of the oscillation outputs of first and second local oscillators through first and second RF switches, as a local oscillation signal to a transmitting part and a receiving part, moves from a certain zone to another, its current traffic channel is switched to a new channel of a different frequency, said method comprising:

a step wherein one of said first and second local oscillators which is not used for current communication is allotted to a channel assigned by a channel assigning signal received by said receiving part and said allotted local oscillator is set to an oscillation frequency corresponding to the frequency of said assigned channel;

a step wherein in an idle time of said receiving part in said current communication said second RF switch is controlled to select and apply the oscillation output of said allotted local oscillator, as said local oscillation signal, to said receiving part, and a down link hand-off preparatory signal from a new base station is received in said assigned channel, by which said receiving part is made ready for hand-off;

a step wherein in an idle time of said transmitting part in said current communication said first RF switch is controlled to select and apply the oscillation output of said allotted local oscillator, as said local oscillation signal, to said transmitting part, and an up link hand-off preparatory signal is transmitted to said new base station in said assigned channel; and a step wherein the output of said allotted local oscillator is applied as said local oscillation signal to each of said transmitting part and said receiving part through controlling said first and second RF switches, and communication over said assigned channel is started.

4. The hand-off method of claim 3, wherein said mobile communication system employs a time division multiplex communication system, said step of making said receiving part ready for hand-off includes a step of receiving a down link synchronizing signal from said new base station and synchronizing said receiving part, with said second RF switch held in the state of selecting said allotted local oscillator, and said up link hand-off preparatory signal transmitting step includes a step of transmitting an up link synchronizing signal to said new base station, with said first RF switch held in the state of selecting said allotted local oscillator.

5. The hand-off method of claim 4, wherein said step of making said receiving part ready for hand-off includes a step of receiving, after transmitting said up link synchronizing signal, a down link continuity test pattern signal from said new station, with said second RF switch held in the state of selecting said allotted local oscillator, and said up link hand-off preparatory signal transmitting step includes a step of transmitting an up ink continuity test pattern signal to said new base station, with said first RF switch held in the state of selecting said allotted local oscillator.

6. The hand-off method of claim 4 or 5, wherein the transmitting frequency of said transmitting part differs from the receiving frequency of said receiving part in the same traffic channel.

7. The hand-off method of claim 4 or 5, wherein the transmitting slot of said transmitting part in said mobile station is shifted relative to the receiving slot of said receiving part by at least one slot time.

8. The hand-off method of claim 3, wherein said mobile communication system employs a frequency division multiplex communication system having a frame configuration including at least one idle time provided by time-compressing a signal, said step of making said receiving part ready for hand-off includes a step of receiving a down link synchronizing signal from said new base station in said idle time of reception, with said second RF switch held in the state of selecting said allotted local oscillator, and said up link hand-off preparatory signal transmitting step includes a step of transmitting an up link synchronizing signal to said base station in said idle time of transmission, with said first RF switch held in the state of selecting said allotted local oscillator.

9. The hand-off method of claim 3, wherein said mobile communication system is a frequency division multiplex communication system having a frame configuration including at least one idle time provided by time-compressing a signal, said step of making said receiving part ready for hand-off includes a step of receiving a down link continuity test pattern signal from said new base station in said idle time of reception, with said second RF switch held in the state of selecting said allotted local oscillator, and said up link hand-off preparatory signal transmitting step includes a step of transmitting an up link continuity test pattern signal to said new base station in said idle time of transmission, with said first RF switch held in the state of selecting said allotted local oscillator.

10. The hand-off method of claim 8 or 9, wherein there is a time shift between the receiving signal frame and the transmitting signal frame so that said idle time of reception and said idle time of transmission do not overlap each other.

* * * * *